United States Patent
Tiemann

(10) Patent No.: US 7,059,835 B2
(45) Date of Patent: Jun. 13, 2006

(54) TURBINE, IN PARTICULAR A GAS TURBINE, AND A BLADE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 293 days.

(21) Appl. No.: 10/681,520

(22) Filed: Oct. 8, 2003

(65) Prior Publication Data

US 2004/0109764 A1    Jun. 10, 2004

(30) Foreign Application Priority Data

Oct. 21, 2002    (EP) .................................. 02023474

(51) Int. Cl.
*F10D 5/08*    (2006.01)

(52) U.S. Cl. .................. 416/96 R; 416/95; 416/193 A; 416/248

(58) Field of Classification Search .................. 416/95, 416/96 R, 96 A, 97 R, 190, 193 A, 248, 416/500; 415/115
See application file for complete search history.

(56) References Cited

U.S. PATENT DOCUMENTS 4,460,314 A * 7/1984 Fuller ......................... 416/500
5,281,097 A * 1/1994 Wilson et al. ........... 416/193 A
5,415,526 A * 5/1995 Mercadante et al. ........ 416/190
6,017,189 A * 1/2000 Judet et al. ................ 416/97 R

FOREIGN PATENT DOCUMENTS

DE    199 40 556 A 1    3/2001
EP    1 028 228 A1    8/2000

* cited by examiner

*Primary Examiner*—Christopher Verdier

(57) ABSTRACT

A turbine (1) with a rotationally symmetrical rotor (4) on rotary bearings which has on its outer perimeter moving blade retaining grooves running transverse to the outer perimeter and set at the same angular distance from one another, having a moving blade (13) that has a vane (24) and a moving blade foot (19) which corresponds to the moving blade retaining groove (18) and which is inserted in one of the moving blade retaining grooves (18), wherein a platform (23) is located between the moving blade foot (19) and the vane (24) and extends transverse to the moving blade foot (19), having a baffle cooling element (22) which is located between two directly adjacent moving blades (13) between its platforms (23) and the rotor (4) and through which a cooling fluid can flow to cool the platform (23). It is proposed that the baffle cooling elements (22) are each formed from two independently moveable halves (20, 21) and that the two halves (20, 21) of the baffle cooling elements (22) are automatically pressed tight against each other by centrifugal force during turbine operation.

14 Claims, 3 Drawing Sheets

TURBINE, IN PARTICULAR A GAS TURBINE, AND A BLADE

CROSS REFERENCE TO RELATED APPLICATIONS

This application claims priority to European application No. 02023474.6 EP, filed Oct. 21, 2002, and incorporated by reference herein in their entirety.

FIELD OF INVENTION

The present invention relates to a turbine, in particular a gas turbine for generating energy by burning a fuel/air mixture to produce a hot gas.

BACKGROUND OF INVENTION

Gas turbines in which a hot working medium flows past wings on moving blades in a ring-shaped hot gas channel are generally known. These blades are arranged as a ring on the outer perimeter of a turbine disc which sits on the rotor of the gas turbine. For fixing to the turbine disc, each blade has a fir-tree-shaped foot that slots into a corresponding groove running transverse to the outer perimeter of the turbine disc. Arranged between the wings of the blades and the blade feet connected to the turbine disc are platforms running transverse to the blades that delimit the hot gas channel on its radial internal side. To withstand thermal stresses, the platform is exposed to cooling fluid, as is the wing of a blade.

SUMMARY OF INVENTION

The object of the present invention is to specify a blade and a turbine.

The solution provides for each of the baffle cooling elements to be formed from two halves that can move independently of one another and for means to be provided to ensure that the two halves of the baffle cooling elements are automatically pressed close together owing to centrifugal forces during turbine operation. Splitting the baffle cooling element located between two directly adjacent blades into two halves enables each blade to be slotted individually into the blade retaining groove with one half on the left and one half on the right of the blade foot. Any gap between the moving halves is automatically closed tight during turbine operation as the centrifugal forces press the two halves together because of the means provided.

Hitherto, a single-piece baffle cooling element has usually been fixed between two directly adjacent platform undersides. To fix these baffle cooling elements the platform undersides had stops running in the direction of the perimeter of the turbine disc in the area of the fronts of the blade feet. The stops extending in the direction of the perimeter for the baffle cooling elements ran transverse to the alignment of the blade retaining grooves. This meant that the turbine disc had to be fitted with the blades and the baffle cooling elements simultaneously. All the blades of one ring were first inserted loosely in their retaining grooves, then all the baffle cooling elements were added underneath the platforms so that all the blades together with the baffle cooling elements could be pushed fully into the retaining grooves simultaneously. The invention removes the need for such difficult and time-consuming assembly and disassembly of blades.

In a beneficial embodiment the means for pressing the halves together comprise inclined friction surfaces on the platform underside facing the blade foot on which appropriate sliding plates are provided on the halves during turbine operation. The inclines are chosen such that the halves are pressed together under the influence of centrifugal force. Any gap between the halves is then closed tight.

The sliding plates are preferably provided as friction surfaces which form a sealed curve with the matching friction surfaces.

In a further beneficial embodiment, leakage losses of cooling fluid are reduced if the matching friction surfaces and the sliding plates in the matching area form a virtually sealed curve. The cooling fluid then flows almost entirely through the baffle cooling element during turbine operation.

The blade foot extending in the insertion direction preferably has a front section and a back section in which on the platform underside there is a stud which projects radially inwards as an inclined matching friction surface and which extends away from the blade foot to the platform edge with reducing height. The halves at the matching friction surface therefore move towards one another under the effect of centrifugal force.

An identical effect is achieved in a beneficial development that features a plane arranged at an angle to the longitudinal axis along the blade foot bordering the platform as an inclined matching friction surface.

A simple sealing arrangement is produced if each of the two halves of the baffle cooling elements has a surface that faces the opposite half and the two surfaces lie tight against each other under the effect of centrifugal force.

The blade has on its platform underside facing the moving blade foot a movable half of a baffle cooling element. During turbine operation the centrifugal effect causes the movable half to adopt a defined position on the platform underside. There is some free play between the half and the blade which makes it easier to install both elements into the rotor of a turbine. In addition, splitting the baffle cooling element into halves enables blades of a ring to be replaced individually without all the blades having to be removed at the same time, as was previously the case.

In a beneficial embodiment the blade features a half on both sides of the blade foot. Adequate cooling of both sides of the platform can therefore be achieved. The baffle cooling element is therefore formed from two adjacent halves of two neighboring blades.

The blade foot and/or the platform underside preferably comprise inclined matching friction surfaces against which sliding plates of one half are pressed tight under the effect of centrifugal force. On the matching friction surface the half moves to its operating position under the effect of the centrifugal force that is present during turbine operation. The half lies tight against the platform underside with the result that leakage losses are reduced.

Particularly beneficial is a development in which the inclination of the matching friction surfaces is such that under the effect of centrifugal force the half moves away from the blade foot.

Directly adjacent moving halves of two directly adjacent blades are then pressed together under the effect of centrifugal force so that any gap between them is sealed tight.

BRIEF DESCRIPTION OF THE DRAWINGS

The invention is described below with reference to the drawings, in which.

DETAILED DESCRIPTION OF INVENTION

Figure 1:
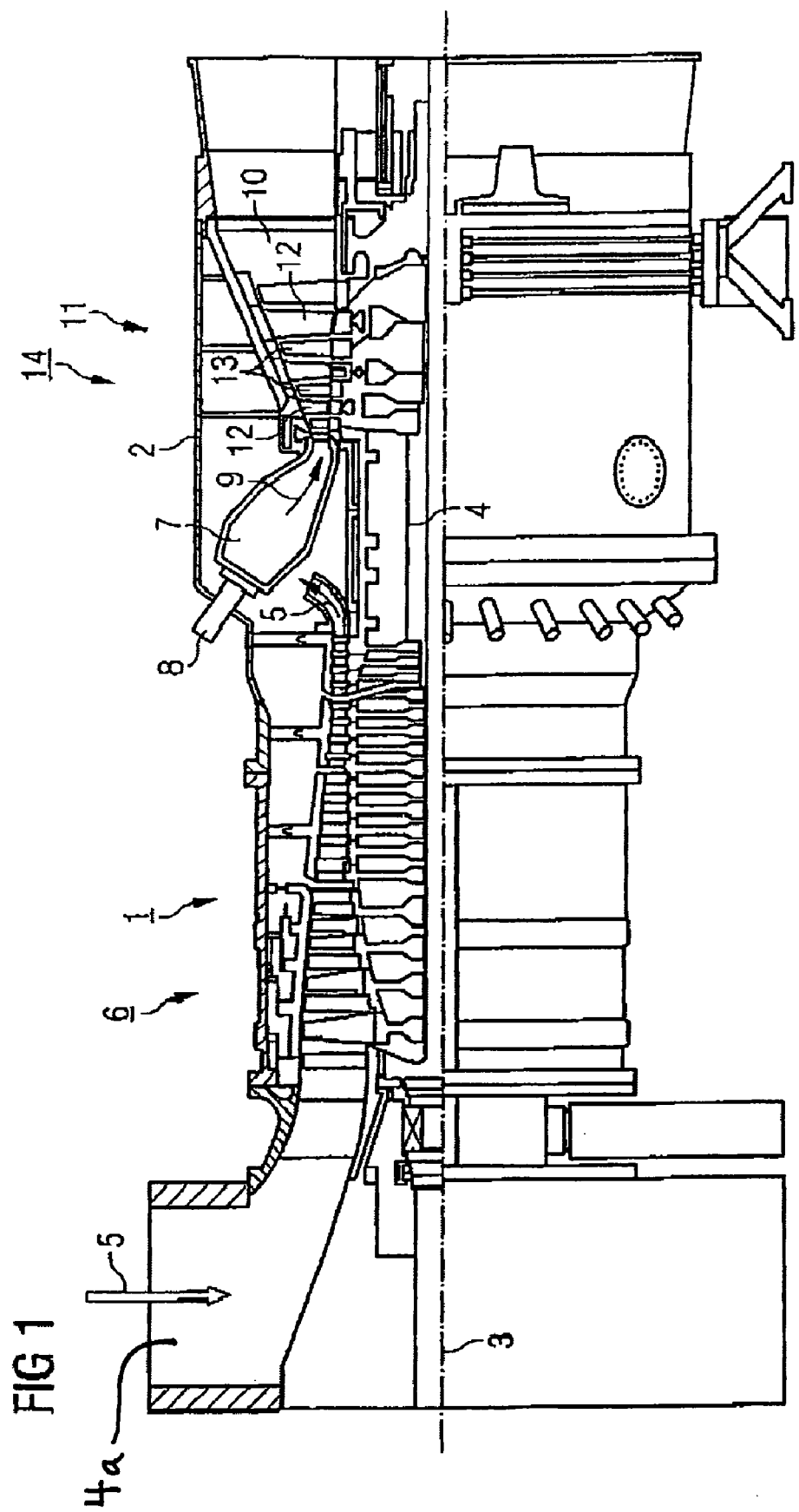
FIG. 1 shows a part-sectioned side view of a gas turbine.

FIG. 1 shows a part-sectioned side view of a gas turbine 1 as a schematic diagram. The gas turbine 1 has a casing 2 in which a rotor 4 is mounted on a rotary bearing around the axis of rotation 3. With reference to FIG. 1, an intake chamber 4a is located on the left side of the rotor, which is followed by a compressor 6 into which cooling air 5 is drawn and compressed. Located downstream of the compressor 6 is an annular combustion chamber 7 that has a burner 8 on its outer end. In the burner 8 the compressed cooling air 5 from the compressor 6 is mixed with a fuel and burnt in the combustion space of the annular combustion chamber 7 to produce a hot gas 9. The hot gas 9 flows along an adjoining ring-shaped hot gas channel 10 past several turbine stages 11, each of which is formed from a vane ring arranged in the hot gas channel 10, each vane ring being followed by a blade ring. The vanes 12 of the vane ring are attached to the casing 2 of the gas turbine 1, and the blades 13 of the blade ring are attached to a ring-shaped turbine disc 16 mounted permanently on the rotor 4.

By means of the blades 13 the energy of the hot gas 9 is converted into the rotational energy of the rotor 4. The rotor 4 drives a generator (not shown). The compressor 6 is also driven by the rotor 4.

Figure 2:
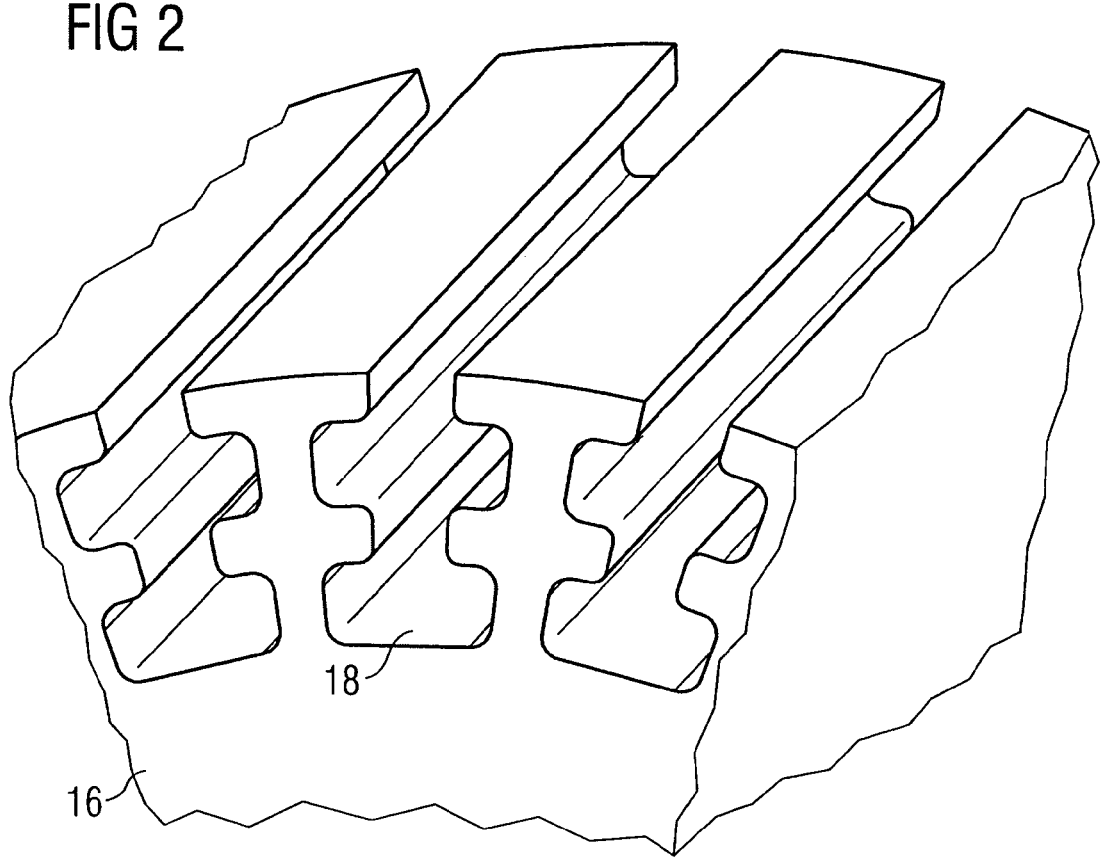
FIG. 2 shows a sector-shaped section of a turbine disc with fir-tree-shaped blade retaining grooves and FIG. 3 shows a blade with halves arranged on both sides.

FIG. 2 shows a sector-shaped section of the turbine disc 16. The blade retaining groove 18 formed in the radial direction is fir-tree-shaped in cross-section and runs transverse to the outer perimeter. Blades can be slotted into the blade retaining grooves 18. For this purpose, the blades have a foot 19 corresponding to the blade retaining groove 18.

Figure 3:
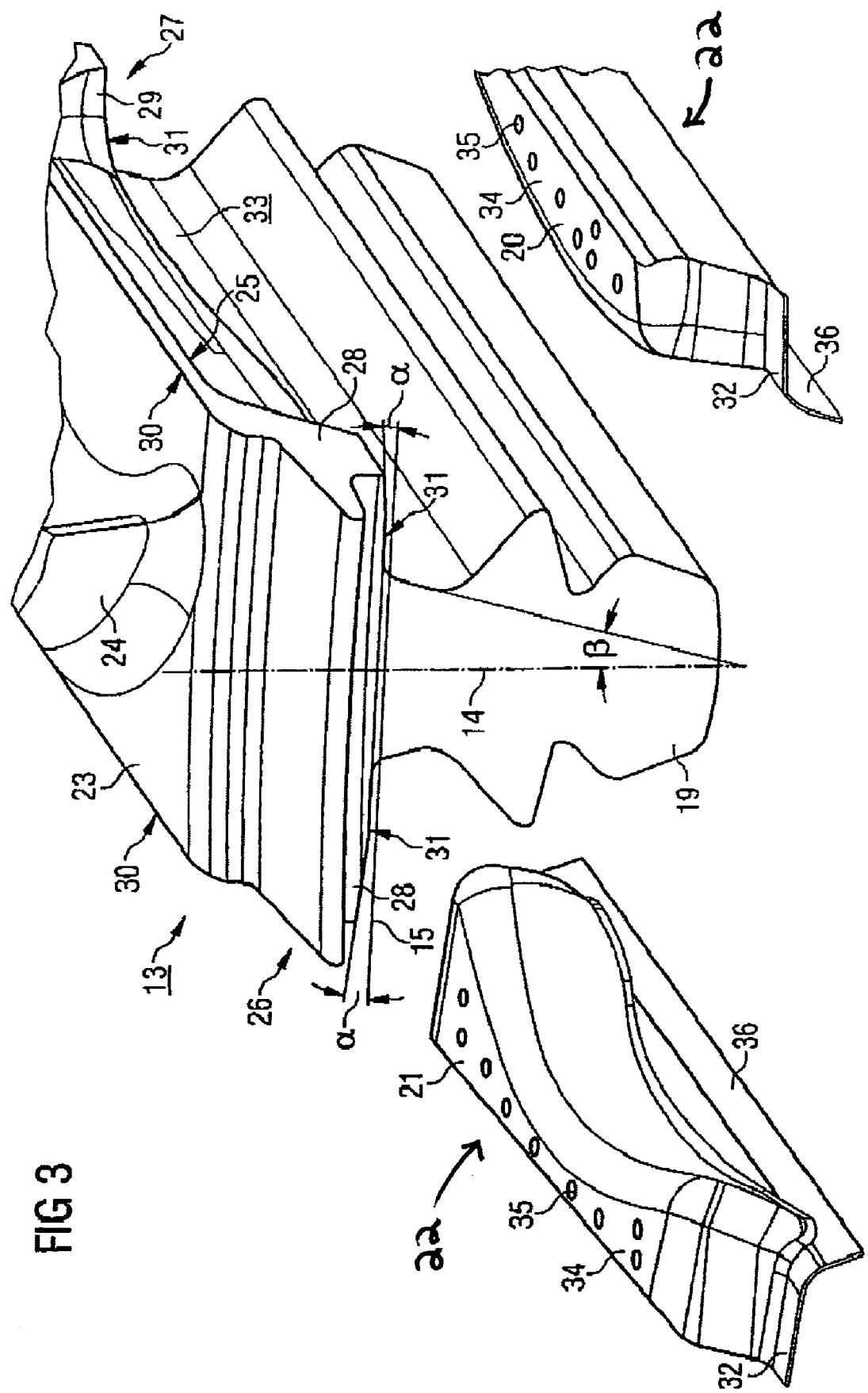

FIG. 3 shows a perspective drawing of a blade 13 with baffle cooling elements 22 arranged on both sides of the blade foot 19. The baffle cooling elements 22 are each formed from two halves 20, 21, with only one half 20, 21 being shown in FIG. 3 on either side of the blade foot 19. Consequently, to the right of the blade foot 19 underneath the right side of a platform 23 the left half 20 of the baffle cooling element 22 is shown, and to the left of the blade foot 19 underneath the left side of the platform 23 the right half 21 of the baffle cooling element 22 is shown. Along its radial longitudinal axis 14 the blade 13 has a foot 19, the platform 23 running transverse to it and a wing 24.

On the radial internal platform underside 25 there are studs 28, 29 projecting radially inwards in the front section 26 and in the rear section 27. These extend from the blade foot 19 in the direction of the side platform edge 30. The studs 28, 29 are inclined so that the height they project from the blade foot 19 reduces towards the edge of the platform 30. A tangent 15 perpendicular to the longitudinal axis 14 and to the radius of the rotor 4 therefore forms an acute angle α with the studs 28, 29 running towards the edge of the platform 30. The sides of the studs 28, 29 facing the turbine disc 16 are formed as matching friction surfaces 31.

A further matching friction surface 33 runs along the blade foot 19 between this and the platform underside 25. The matching friction surface 33 also forms an acute angle β with the longitudinal axis 14.

The side of the blade foot 19 not shown in FIG. 3 is formed in the same way.

The two halves 20, 21 each comprise sliding plates 32, 36 and a baffle cooling plate 34 with cooling openings 35 shown here only schematically. The sliding plates 32, 36 are arranged as friction surfaces on the outer perimeter of the halves 20, 21.

The right half 21 of the baffle cooling element 22 shown in FIG. 3 on the left of the blade 13 is formed approximately as a mirror image of the left half 20.

In the assembled state, the elements 13, 20, 21 lie adjacent to one another. The baffle cooling plates 34 extend into the recesses that are formed on the platform underside 15 between the front stud 28 and the back stud 29. The sliding plates 32, 36 of the halves 20, 21 then lie adjacent to the matching friction surfaces 31, 33 of the blade 13, with the baffle cooling plates 34 following the curve of the platform underside 25 at a certain distance.

During operation of the gas turbine 1 the rotor 4 turns and with it the blades 13 located on the turbine discs 16. The centrifugal forces acting on the two halves 20, 21 located one each under the platforms 23 of two neighboring blades 13 press these radially outwards. The studs 28, 29 act as matching friction surfaces 31 for the moveable halves 20, 21. Because of the inclination of the studs 28, 29, the halves 20, 21 of a baffle cooling element 22 move towards the side platform edge 30 and therefore towards one another.

The matching friction surfaces 33 support this movement of the halves 20, 21. Under the effect of centrifugal force their sliding plates 26 slide radially outwards and thereby push the halves 20, 21 away from the moving plate foot 19.

In turbine operation the two halves 20, 21 of a baffle cooling element 22 that form a pair lie tight against each other. Two platform undersides 25 of two directly adjacent blades 13 are therefore separated from a coolant supply by a virtually sealed curve so that the coolant used can essentially only flow through the baffle cooling openings 35 to the platforms 23. Leakage losses are thus largely prevented.

The sealed curve runs along the matching friction surfaces 31, 36 of two adjacent blades 13 against which the two tightly pressed halves 20, 21 of a baffle cooling element 22 also sit tight with their sliding plates 32, 36.

What is claimed is:

1. A turbine comprising:
   a rotationally symmetrical rotor on rotary bearings having blade retaining grooves extending transverse to the outer perimeter of the rotor and set at a distance from the blade retaining grooves;
   a blade having a wing and a blade foot which corresponds to the blade retaining groove and inserted in a blade retaining groove;
   a platform located between the blade foot and the wing and that extends transverse to the blade foot;
   a baffle cooling element located between two adjacent blades between the platform and the rotor and through which a cooling fluid can flow to cool the platform, wherein the baffle cooling element is formed from two independently moveable portions and the two portions are pressed tight against each other by centrifugal force during turbine operation.

2. A turbine according to claim 1, wherein mechanisms for pressing the portions together comprise inclined matching friction surfaces on the platform underside facing the blade foot against which sliding plates appropriately located on the portions lie during turbine operation, whereby the inclinations are selected so that the portions are pressed against one another under the effect of centrifugal force.

3. A turbine according to claim 2, wherein the sliding plates are formed as friction surfaces.

4. A turbine according to claim 3, wherein the matching friction surfaces and the sliding plates in the matching area form a virtually sealed curve so that during turbine operation the cooling fluid almost entirely flows through the baffle cooling element.

5. A turbine according to claim 2, wherein the matching friction surfaces and the sliding plates in the matching area form a virtually sealed curve so that during turbine operation the cooling fluid almost entirely flows through the baffle cooling element.

6. A turbine according to claim 2, wherein the blade foot extending in the insertion direction has a front section and a back section, each section comprising a stud on the platform underside which projects radially inwards which extends away from the moving blade foot to the platform edge.

7. A turbine according to claim 2, wherein a plane is arranged as an inclined matching friction surface at an angle to a longitudinal axis along the blade foot bordering the platform.

8. A turbine according to claim 2, wherein each of the two portions of the baffle cooling element has a matching surface that faces the opposite portion and they lie tight against each other under the effect of centrifugal force.

9. A turbine according to claim 1, wherein the blade foot extending in the insertion direction has a front section and a back section, each section comprising a stud on the platform underside which projects radially inwards which extends away from the blade foot to the platform edge.

10. A turbine according to claim 1, wherein a plane is arranged as an inclined matching friction surface at an angle to a longitudinal axis along the blade foot bordering the platform.

11. A turbine according to claim 1, wherein each of the two portions of the baffle cooling element has a matching surface that faces the opposite portion and they lie tight against each other under the effect of centrifugal force.

12. A turbine according to claim 1, wherein the movable portions are halves.

13. A turbine blade comprising:
a blade foot located along a longitudinal axis and shaped for cooperative association with a blade retaining groove in a turbine disc;
a platform and comprising curved underside surfaces on each side of the longitudinal axis;
a wing extending from the platform opposed the blade foot;
a front stud and a back stud on each side of the blade, each stud defining a respective friction surface disposed at an acute angle relative to a tangent to the longitudinal axis;
a baffle cooling element comprising two independently movable portions, one portion being disposed adjacent each platform underside curved surface when installed on the turbine disc, each portion comprising a cooling plate comprising cooling openings for passing cooling fluid to the underside of the platform, and each portion comprising a first sliding plate adapted for sliding contact with a respective one of the stud friction surfaces under influence of a centrifugal force generated during rotation of the turbine disc, and each portion comprising a second sliding plate adapted for sliding contact with the respective curved underside surface under influence of the centrifugal force;
the angle of the respective stud friction surfaces being effective to move the respective baffle cooling element portions away from the longitudinal axis under influence of the centrifugal force and into contact with respective mating baffle cooling element portions of adjacent blades when installed on the turbine disc.

14. A turbine comprising the turbine blade of claim 13.

* * * * *